(12) United States Patent
Florin et al.

(10) Patent No.: US 11,074,228 B2
(45) Date of Patent: Jul. 27, 2021

(54) THREE-DIMENSIONAL FILE EVENT REPRESENTATION

(71) Applicant: Code 42 Software, Inc., Minneapolis, MN (US)

(72) Inventors: Thomas Florin, River Falls, WI (US); Thomas Anthony Lindquist, Minnetonka, MN (US); David Gibbens, Forest Lake, MN (US)

(73) Assignee: Code 42 Software, Inc., Minneapolis, MN (US)

( * ) Notice: Subject to any disclaimer, the term of this patent is extended or adjusted under 35 U.S.C. 154(b) by 87 days.

(21) Appl. No.: 16/362,392

(22) Filed: Mar. 22, 2019

(65) Prior Publication Data
US 2020/0301892 A1 Sep. 24, 2020

(51) Int. Cl.
*G06F 7/00* (2006.01)
*G06F 16/185* (2019.01)
*G06N 3/08* (2006.01)
*G06F 16/17* (2019.01)
*G06F 21/62* (2013.01)

(52) U.S. Cl.
CPC ........ *G06F 16/185* (2019.01); *G06F 16/1734* (2019.01); *G06F 21/6209* (2013.01); *G06N 3/08* (2013.01)

(58) Field of Classification Search
CPC ............... G06F 16/185; G06F 16/1734; G06F 21/6209; G06N 3/08
USPC .................................................. 707/600–899
See application file for complete search history.

(56) References Cited

U.S. PATENT DOCUMENTS

2018/0307406 A1* 10/2018 Pokrzywka ........... G06F 3/0488

* cited by examiner

*Primary Examiner* — Isaac M Woo
(74) *Attorney, Agent, or Firm* — Schwegman Lundberg & Woessner, P.A.

(57) ABSTRACT

Systems and techniques for three-dimensional file event representation are described herein. File event data may be obtained for a file for a time segment. The file event data may include a file system hierarchy for the file. A spatial file operation map may be generated for the file system hierarchy including a file operation map for the file for the time segment. The file operation map for the file may include a plurality of layers with each layer of the plurality of layers representing a file operation class available for the file. It may be determined that a file operation was performed on the file during the time segment based on the file event data. An indication may be generated on a layer of the plurality layers of the file operation map that the file operation was performed. The layer corresponds to a file operation class of the file operation.

21 Claims, 8 Drawing Sheets

ND FILE EVENT
THREE-DIMENSIONAL FILE EVENT REPRESENTATION

TECHNICAL FIELD

Embodiments described herein generally relate to computer data storage and, in some embodiments, more specifically to three-dimensional file event representation of a network file system and file anomaly detection using the three-dimensional file event representation.

BACKGROUND

Network file systems may allow several user computing devices to access data stored in a central location or distributed across the network. Tracking file events on a network file system may be difficult because there may hundreds or thousands of file operations completed on a given file. Systems logs may be used to track access to a given file. However, systems logs may not provide a comprehensive view of a file event or series of events that may be indicative of a larger anomaly in the network file system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Network file systems may be a target for attackers because they store a large amount of data that is accessible to a plurality of users. Because many user devices have access to the data, compromise of a single device could allow for unauthorized data release, file corruption, and the like. Attacks such as ransomware attacks, computer worms, and the like have the potential to cause catastrophic damage or prevent access to the data stored on the network file system. Being able to effectively detect anomalies in the file system may provide the ability to perform rapid remediation to stop an attack before the file system is compromised.

Traditional techniques using regressive analysis for detecting file system anomalies may provide some protection from attacks. However, traditional techniques may only look at individual files and file events without knowledge of the larger context of events happening within the file system. Thus, traditional techniques may be unable to detect complex attacks that may be designed to thwart traditional detection techniques for example by making each file operation appear as a legitimate operation.

To solve the problem of detecting complex file system anomalies, the solution discussed herein generates a three-dimensional map of the file system events including dimensions for location, event type, and time. The three-dimensional map provides the data necessary to evaluate file events across the network file system for any given period of time to find correlations that are indicative of an anomaly. Anomalies may include unexpected file moves, file modifications, file deletes, combinations of file modifications, and the like. The three-dimensional map may be used as an input to a machine learning processor such as, for example, a convolutional neural network (CNN). The CNN may be trained with training data to identify patterns of various anomalies in the file system. For example, a pattern may include file movement from one location to another, multiple file changes in a single directory, a combination of file changes across a designated set of directories, and the like.

The patterns may then be compared against the three-dimensional map in real time or near real time to detect anomalies. The CNN may also model baseline file operation activity that may indicate normal operation of the network file system. The CNN may detect anomalies when a pattern in the three-dimensional map falls outside of a tolerance for deviation from the baseline. The CNN may learn additional anomaly patterns based on feedback received as a result of such a detection. Thus, the CNN may learn additional anomaly patterns through operation without the need for additional training inputs.

Upon detection of an anomaly, automated (or manual) remediation may be triggered in an attempt to halt the attack. Remediation may consist of actions such as closing network ports, disconnecting client devices, temporarily changing file permissions, and the like. Generating a three-dimensional map of file events and evaluating the map using a machine learning processor increases the anomaly detection precision over traditional file event anomaly detection systems by analyzing the context in which file events are taking place across the network file system. This allows for definition and detection of complex anomalies associated with a variety of attacks. The rapid detection of complex threats allows for quick remediation of the attacks leading to decreased data loss and increased file system availability.

Figure 1:
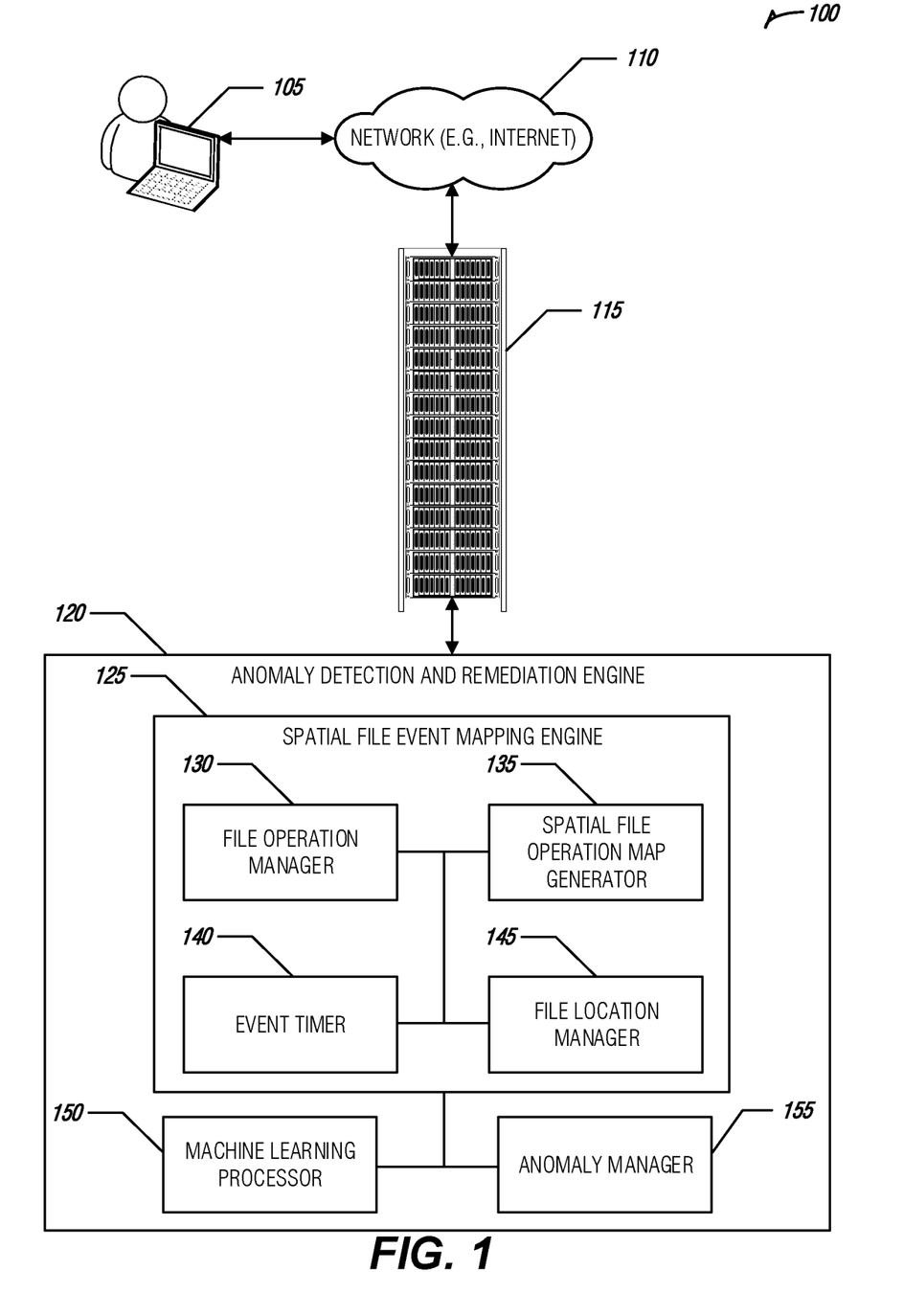
FIG. 1 is a block diagram of an example of an environment and a system for three-dimensional file event representation, according to an embodiment.

FIG. 1 is a block diagram of an example of an environment 100 and a system 120 for three-dimensional file event representation, according to an embodiment. The environment 100 may include a user computing device 105, a network 110 (e.g., the internet, wired network, wireless network, etc.), a network file system 115 (e.g., a distributed file system, a cloud file system, a person to person file system, etc.), and system 120. The system 120 may be an anomaly detection and remediation engine. The system 120 may include a variety of components including a spatial file event mapping engine 125, a machine learning processor 150, and an anomaly manager 155. The Spatial file event mapping engine 125 may include a variety of components including a file operation manager 130, a spatial file operation map generator 135, an event timer 140, and a file location manager 145.

The network file system 115 may include a variety of file directory locations that are spread across a number of storage subsystems including hard disk arrays, virtual hard disks, storage devices of the user computing device 105, cloud-based storage systems, etc. The user computing device 105 may access the network file system 115 via the network 110. In some embodiments, the user computing device 105 may include an application that establishes a secure connection between the user computing device 105 and the network file system 115. The user computing device 105 may be used to perform file operations on files managed by the network file system 115. File operations may include read operations, write operations, delete operations, file permission change operations, and the like. The network file system 115 may record the file operations as events.

The file operation manager 130 may obtain file event data including the file operations for each file in the file system. For example, if a file delete operation is performed by the user computing device 105 on a file named test.doc, the file operation manager 130 may obtain a file delete event for the test.doc file. The file operation manager 130 may work in conjunction with a file system manger of the network file system 115 to track file event occurring within the file system. The event timer 140 may keep time for the file events occurring within the file system. The event timer 140 may assign times to events as they occur. The file location manager 145 may access a file system hierarchy to determine a location for a file that is the subject of a file event. For example, the file test.doc may have been located in the directory c:\documents when the file delete event was initiated and the location of the file delete event may be determined to be c:\documents. The file location manager 145 may also determine a destination for a file move event. For example, the destination may be c:\documents\user1 when a request is received to move file test.doc.

The spatial file operation map generator 135 may generate a three-dimensional map of the file events occurring within the file system. The spatial file operation map generator 135 may organize the map by file event location and file operation type by time. The map may include a cubical structure in which subdirectories are nested inside directories and for a given time, multiple layers may be arranged for the location indicating file event that have occurred for each file in the directory. Each layer represents a file operation type for a given period of time within the directory along with the files that were impacted by the type of file event. For example, if files test.doc, log.txt, and wins.sys are each the subject of a file delete event at time period A and all reside in the c:\documents directory, they will all appear on a file delete event layer within the representation of the c:\documents directory. Examples of the structure of the representation are provided in FIGS. 2 and 3.

The map includes a representation of files that were impacted by a file event for each period of time for each directory. Each period of time may be organized by time and type, where type is any category of file meta data. For example, non-limiting examples of types may include Multipurpose Internet Mail Extension (MIME) type, file category, event type, etc. For example, MIME type may be MP4, Text file, XLS, etc. File categories may include audio file, video file, etc. Event types may include create, read, update, delete, etc. The period of time may vary depending on the granularity desired to establish a pattern for various anomalies. For example, if an anomaly is indicated by several file operations within 100 milliseconds, then the period of time may be set to 100 milliseconds. It may be understood that the period of time may be adjusted based on threat analysis trends. Because the file events are arranged by time and location, a timewise analysis may be performed to find relationships between the file events for a given period of time that are indicative of know threats to the file system.

The spatial file operation map generator 135 may obtain file event data (e.g., from the file operation manager 130) for a file for a time segment (e.g., as designated by the event timer 140). The file event data may include a file system hierarchy (e.g., provided by the file location manager 145) for the file. The spatial file operation map generator 135 may generate a spatial file operation map for the file system hierarchy including a file operation map for the file for the time segment. The file operation map for the file may include a plurality of layers with each layer of the plurality of layers representing a file operation class available for the file.

For example, a plurality of layers of the map may be generated for a file directory that contains the file. The map may be a matrix, either 2-dimensional or 3-dimensional, depending on processing or detection goals. 2-dimensional matrices may be useful for local endpoint processing and immediate detection and action. 3-dimensional matrices may be more suitable for backend processing by a full convolutional neural network (CNN) artificial intelligence (AI). The map may be stored within the file directory and may be stored by a management node responsible for the file system. In an example, the plurality of layers may include one or more of a, a read operation layer, a write operation layer, a delete operation layer, a permission change operation layer, etc. In an example, the spatial file operation map may be divided into segments based on the file system hierarchy. In an example, the spatial file operation map may include a plurality of dimensions. Each dimension of the plurality of dimensions may corresponds to a layer, each dimension may include one or more subsections, and each subsection of the one or more subsections may corresponds to a top-level folder in the file system hierarchy. For example, the map may represent a subdirectory nested in a map representing a top-level directory. In an example, the spatial distance between a first entity and a second entity in the spatial file operation map may be expressed as a directory distance between a first folder in the file system hierarchy corresponding to the first entity and a second folder in the file system hierarchy corresponding to the second entity. For example, the distance between the file events in the layers may be expressed based on the distance between their respective folders in the file system hierarchy. This distance may be used in evaluating the map for potential threats that perform file operations in multiple directories.

The file operation manager 130 may determine that a file operation was performed on the file during the time segment based on the file event data. For example, it may be determined that the test.doc file was deleted by the user computing device 105 at time period A. The file operation manager 130 may generate an indication on a layer of the plurality of layers of the file operation map that the file operation was performed. The layer may correspond to a file operation class of the file operation. For example, the deletion of the test.doc file may be indicated on the file delete layer of the directory c:\documents. This provides an indication that the file was deleted by the user computing device 105 during time period A.

The machine learning processor 150 may process the map as input and may evaluate the map to identify anomalies. For example, the machine learning processor 150 may use pattern matching to identify a similarity between a file event pattern for a known threat and the file events in the map. In another example, the machine learning processor 150 may identify an anomaly based on the file events in the map not matching a file event pattern representing normal operation of the file system. In an example, the machine learning processor 150 may use a convolutional neural network for evaluating the map.

The machine learning processor 150 may be trained using training data including file events that are indicative of various known threats. The machine learning processor 150 may then establish patterns of anomalies using the training data. The machine learning processor 150 may also establish a baseline pattern for normal file event activity in the file system. The machine learning processor 150 may then identify an anomaly when file events in the map are outside of a threshold of the baseline pattern. The machine learning processor 150 may provide notification of the anomaly and based on feedback received in response to the notification may establish a pattern for the anomaly. The anomaly may then be associated with a threat. Thus, the machine learning processor 150 may provide anomaly detection upon establishing the baseline pattern without the use of dedicated training data.

The anomaly manager 155 may receive an indication of an anomaly from the machine learning processor 155 and may take remedial action to prevent data loss and corruption. For example, the anomaly manager 155 may prevent additional file operations by the user computing device 105 if the user computing device 105 has requested the file operations that resulted in the anomaly detection. In another example, the anomaly manager may modify access permissions on files or directories that have been impacted by the file events or that are predicted to be impacted by the treat as determined by the machine learning processor 150. It will be understood that additional remedial actions may be performed by the anomaly manager 155 to prevent further data loss or corruption based on the threat associated with the anomaly.

The machine learning processor 150 may generate a file operation anomaly machine learning model (e.g., a pattern, etc.). The spatial file operation map may be evaluated using the file operation anomaly machine learning model to change a file operation anomaly state from false to positive. For example, the machine learning processor 150 may match a pattern of an anomaly to the spatial file operation map and may change the anomaly state from negative to positive. The state change may provide an indication to the anomaly manager 155 that remediation is necessary. The anomaly manager 155 may prevent access to the file until the file operation anomaly state has changed to negative. This may prevent further data loss or file corruption by preventing the file from being accessed until remediation has occurred. This may also prevent other user computing devices from being infected through access to an infected file.

In an example, the file events may be obtained before the operation has been completed on a file in the network file system 115. The map may be updated with the file event before completion of the file operation so that anomaly detection may be performed by the machine learning processor 150 before file system corruption or data loss is incurred. Thus, evaluation of the three-dimensional map using the machine learning processor 150 may allow for remediation before any impact to the file system.

Figure 2:
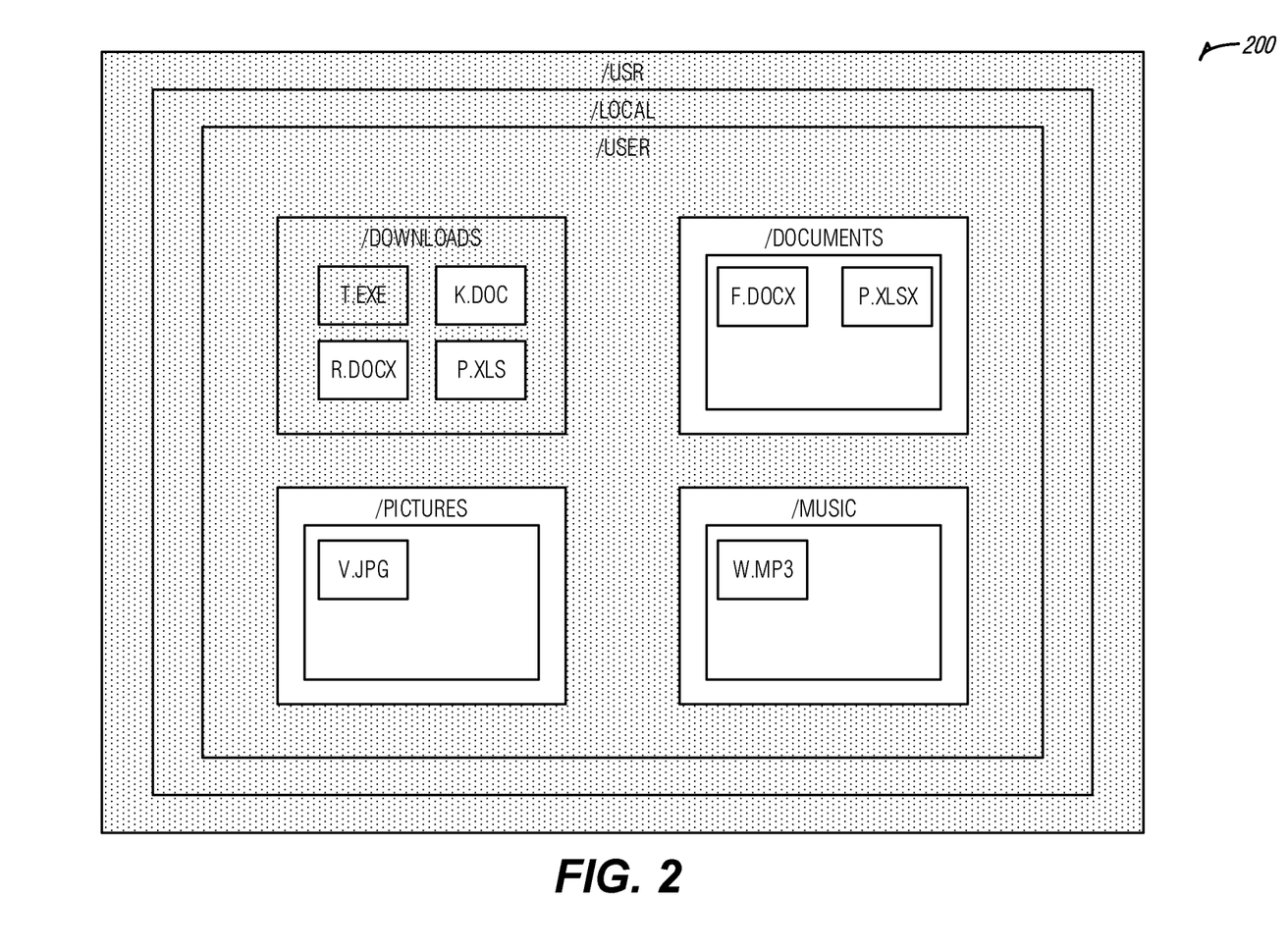
FIG. 2 is an illustration of an example of an unexpanded view of a three-dimensional file event representation, according to an embodiment.

FIG. 2 is an illustration of an example of an unexpanded view 200 of a three-dimensional file event representation, according to an embodiment. The three-dimensional file event representation is an example of a map as described in FIG. 1. As shown in the unexpanded view 200. The map includes a set of nested layers for a top-level directory /usr with subdirectory /local with subdirectory /user. There are further sub directories in the /user directory including /downloads, /documents, /pictures, and /music. Each of the sub directories may include files. For example, the /downloads directory includes file t.exe, k.doc, r.docx, and p.xls. The unexpanded view 200 is a time slice for the file system hierarchy that shows that a file event has occurred in the t.exe file located in the /downloads directory (as indicated by the shading). The unexpanded view shows the dimensions of location and time, by does not show the file event type dimension. The benefits of the three-dimensional data structure are shown in FIG. 3 with the layers used to represent the file event types.

Figure 3:
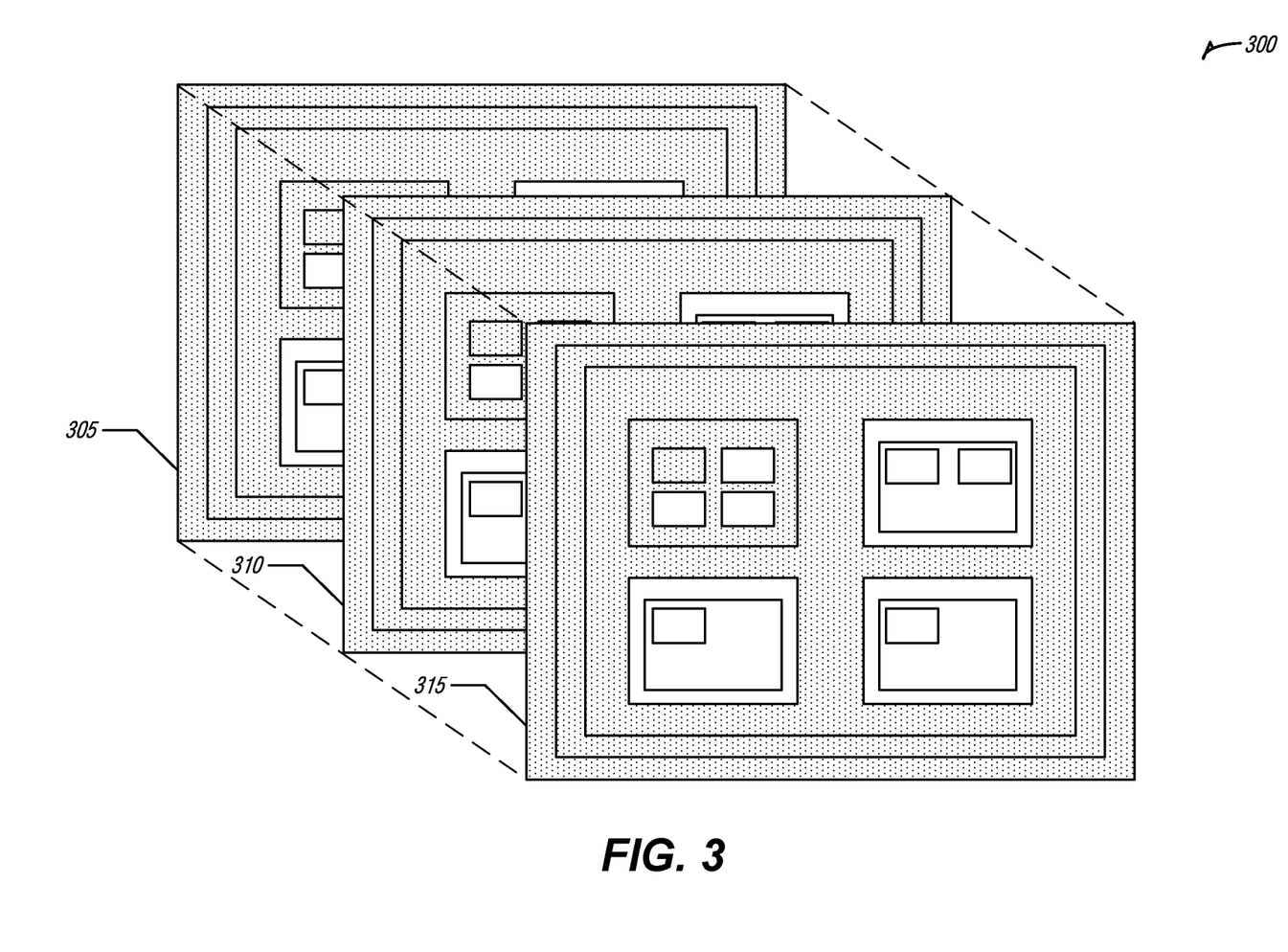
FIG. 3 is an illustration of an example of an expanded three-dimensional file event representation, according to an embodiment.

FIG. 3 is an illustration of an example of an expanded view 300 of a three-dimensional file event representation, according to an embodiment. The expanded view illustrates the three-dimensional file event representation that may be a map as described in FIGS. 1 and 2. In this example expanded view 300. There are three layers comprising a read file operation layer 305, a modify file operation layer 310, and a delete file operation layer 315. The shading indicates directories and files that were impacted (or will be impacted) by a file event. For example, operations one three layers (e.g., read, modify, and delete) may have experienced file events for a t.exe file located in the /downloads directory (as indicated by the shading). If other files were impacted they would be represented by shading in the expanded view 300. Each layer represents file events for the same point in time or during the same time interval. Thus, each operation performed on a file is tracked in the map. This allows the machine learning processor to evaluate events across the file system for a given point in time to identify anomalies. Maintaining the three-dimensional map provides the machine learning processor to determine relationships between file events based on time, location, and event type. This granular data may be used to establish complex patterns that allow the machine learning processor to identify known anomalies that may be associated with know threats and may allow the machine learning processor to identify unknown anomalies based on how much the current file events deviate from patterns of normal file event activity.

Figure 4:
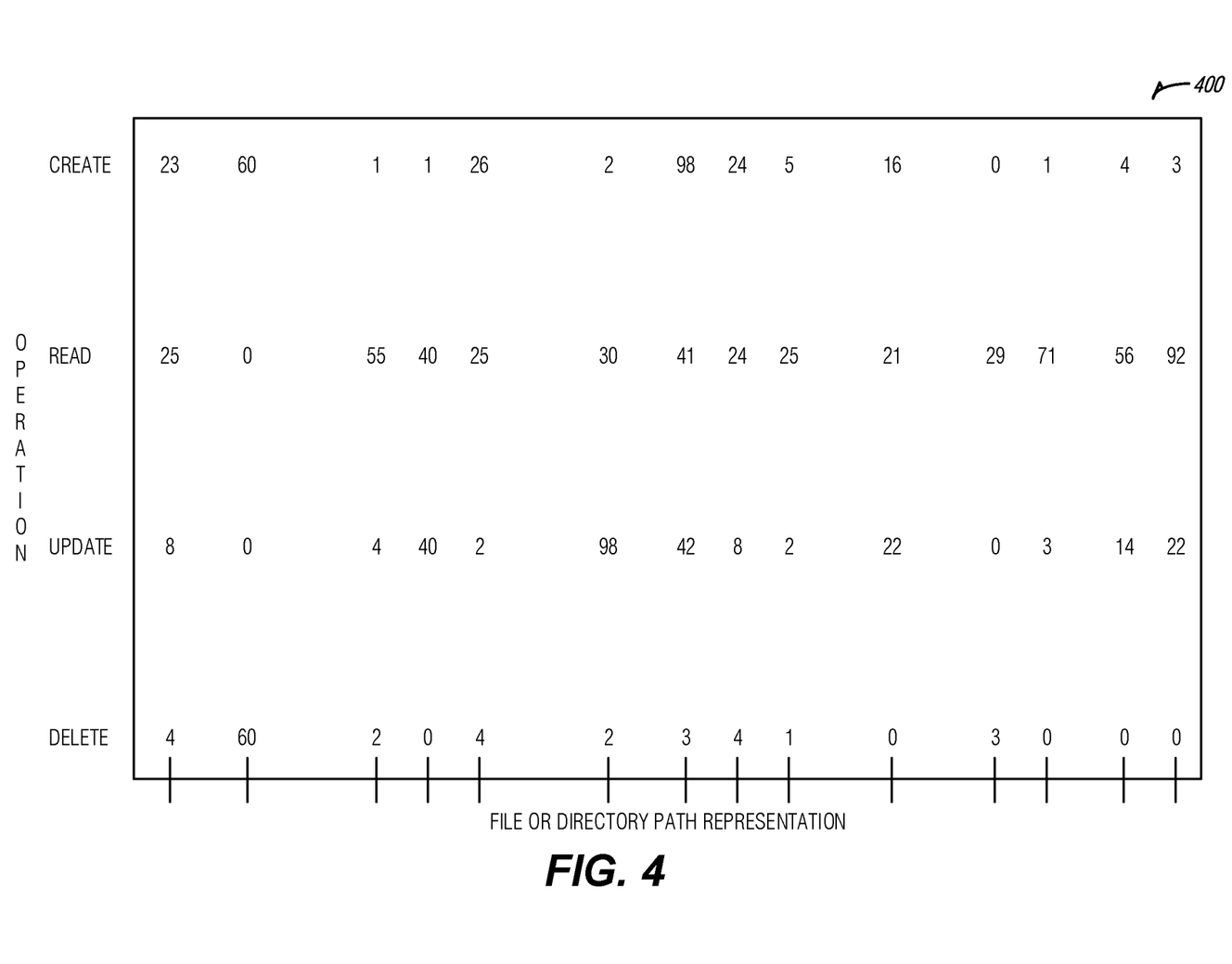
FIG. 4 is an illustration of an example of an operation type time slice matrix for three-dimensional file event representation, according to an embodiment.

FIG. 4 is an illustration of an example of an operation type time slice matrix 400 for three-dimensional file event representation, according to an embodiment. The operation time slice matrix 400 may illustrate the three-dimensional file event representation that may be a map as described in FIGS. 1 and 2. The operation type time slice matrix 400 may be generated from three-dimensional input that includes file event streams. The operation type time slice matrix 400 may be used to detect anomalies by converting file system activity data into a data matrix that may be used as input to an anomaly detector (e.g., the machine learning processor 150 and the anomaly manager 155 as described in FIG. 1, etc.).

The operation type time slice matrix 400 may include a file or directory path representation along the x-axis and operations along the y-axis. A monitored file or directory may be hashed to provide a unique signature forming the x-coordinate. The operation type may form the y-coordinate.

Figure 6:
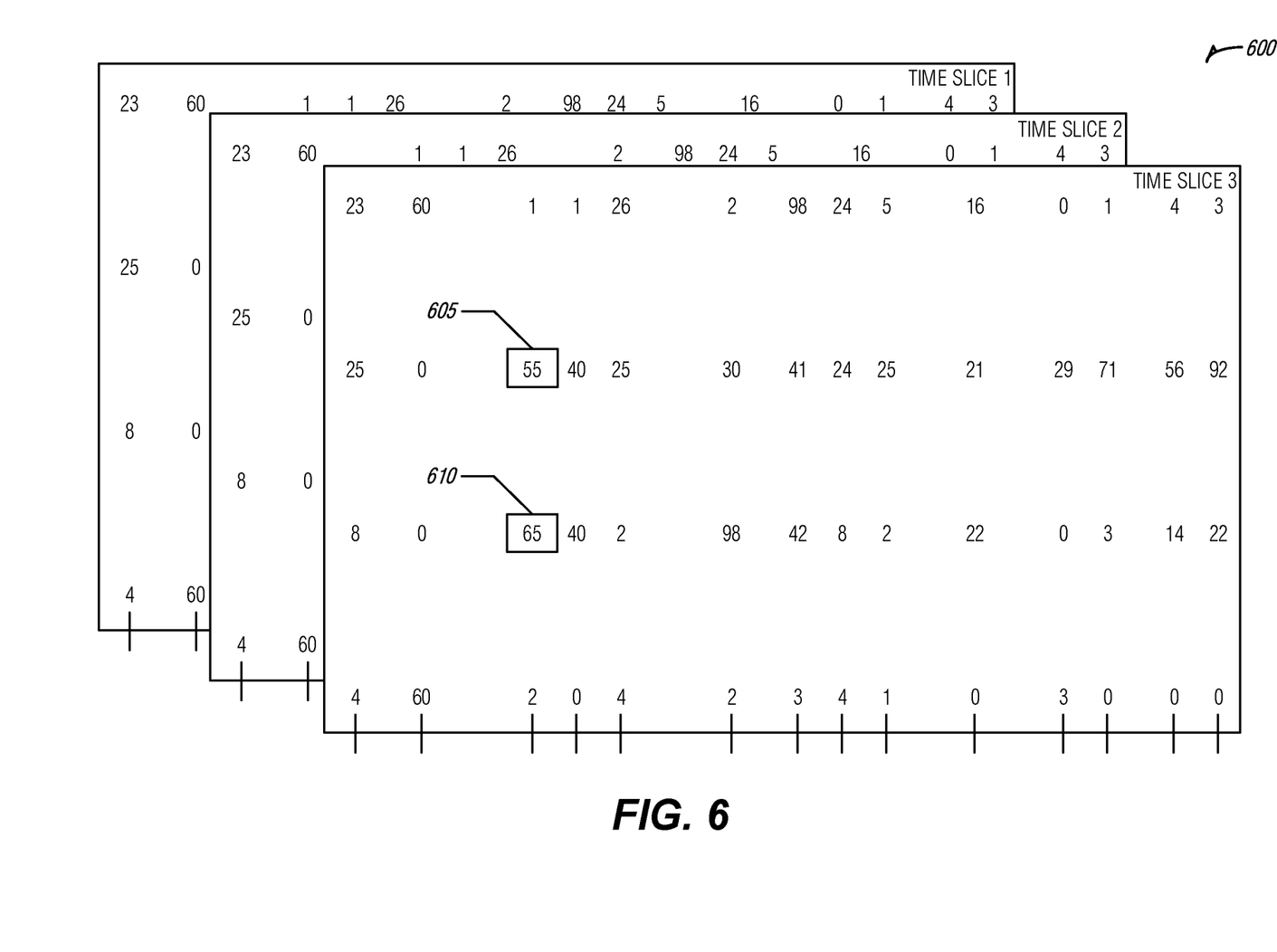
FIG. 6 is an illustration of an example of a time series of time slice matrices for three-dimensional file event representation, according to an embodiment.

A number of occurrences of an operation type may be the data value point at the intersection of the x-axis and y-axis. The operation type time slice matrix 400 represents a "picture" of the activity occurring in a storage device during the given time slice. A series of time slices may be stacked together with time representing the z-axis to look for unexpected changes or "movement" of activity in the time slice matrices through time (e.g., as shown in FIG. 6). The movement may be detected using image analysis tools that may be able to recognize pattern changes, motion spikes, trends, etc. in the visual representations of the file system activity. Anomalies may be detected and flagged for mitigation as described in FIG. 1.

Figure 5:
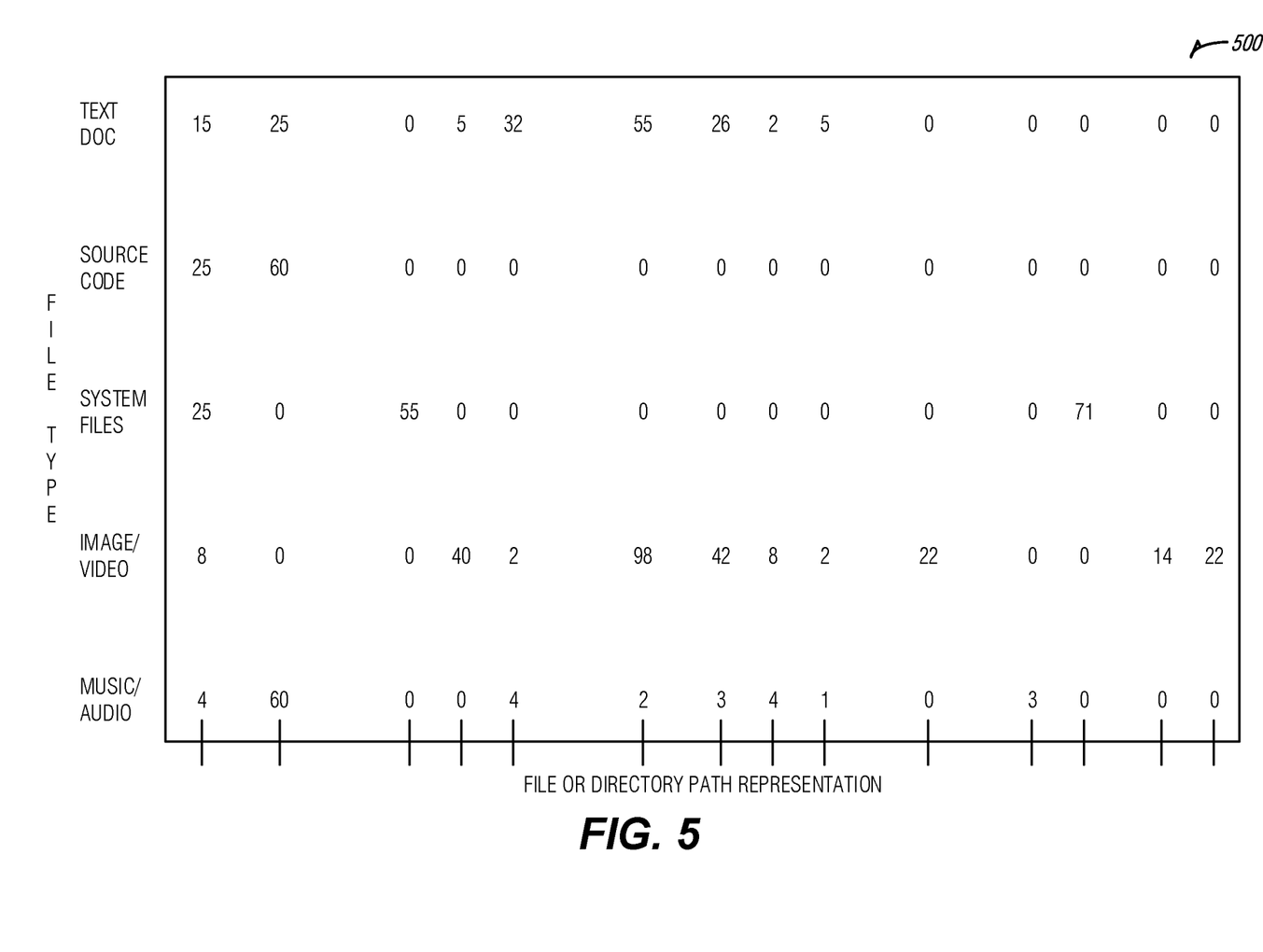
FIG. 5 is an illustration of an example of a file type time slice matrix for three-dimensional file event representation, according to an embodiment.

FIG. 5 is an illustration of an example of a file type time slice matrix 500 for three-dimensional file event representation, according to an embodiment. The file type time slice matrix may illustrate the three-dimensional file event representation that may be a map as described in FIGS. 1 and 2. The file type time slice matrix 500 operates similarly to the operation type time slice matrix 400 as described in FIG. 4. In the file type time slice matrix 500, file types replace operation types on the y-axis. The file type time slice matrix 500 may organize the file activity by file type to look for unexpected activity by file type. For example, an anomaly may be detected when in is determined that text documents are accumulating in a location normally occupied by system files.

It will be readily understood that a variety of file and file system attributes may be used on the y-axis to produce representations of various aspects of the file system and file system activity infrastructure. The y-coordinate may include any useful representation of the files.

FIG. 6 is an illustration of an example of a time series 600 of time slice matrices for three-dimensional file event representation, according to an embodiment. The time series 600 may illustrate the three-dimensional file event representation that may be a map as described in FIGS. 1 and 2 and may include a series of time slice matrices such as operation type time slice matrix 400 and file type time slice matrix 500. The time series 600 may represent a three-dimensional image of the file activity occurring in a file system over a period of time. The time series 600 may be evaluated using a graph algorithm to detect movement across the images representing each time slice. The evaluation may detect movement through the images that may represent unusual file system activity. The unusual file system activity may, depending on its character, be detected as an anomaly and may trigger remedial action by a storage system hosting the affected file system.

For example, there may be a greater than normal number of read operations 605 occurring at a period of time for a file location in time slice 3 along with a grater than normal number of update operations 610 for the period of time for the file location in time slice 3. An evaluation of time slice 1, time slice 2, and time slice 3 may indicate that this is new and unexpected movement in the read and update operations for the file location. Hence, it may be determined that the activity represented by the image of time slice 3 represents an anomaly. Remedial action may be trigger which may include preventing further update operations from being performed in the file location, logging the event, notifying an administrator, and the like.

Figure 7:
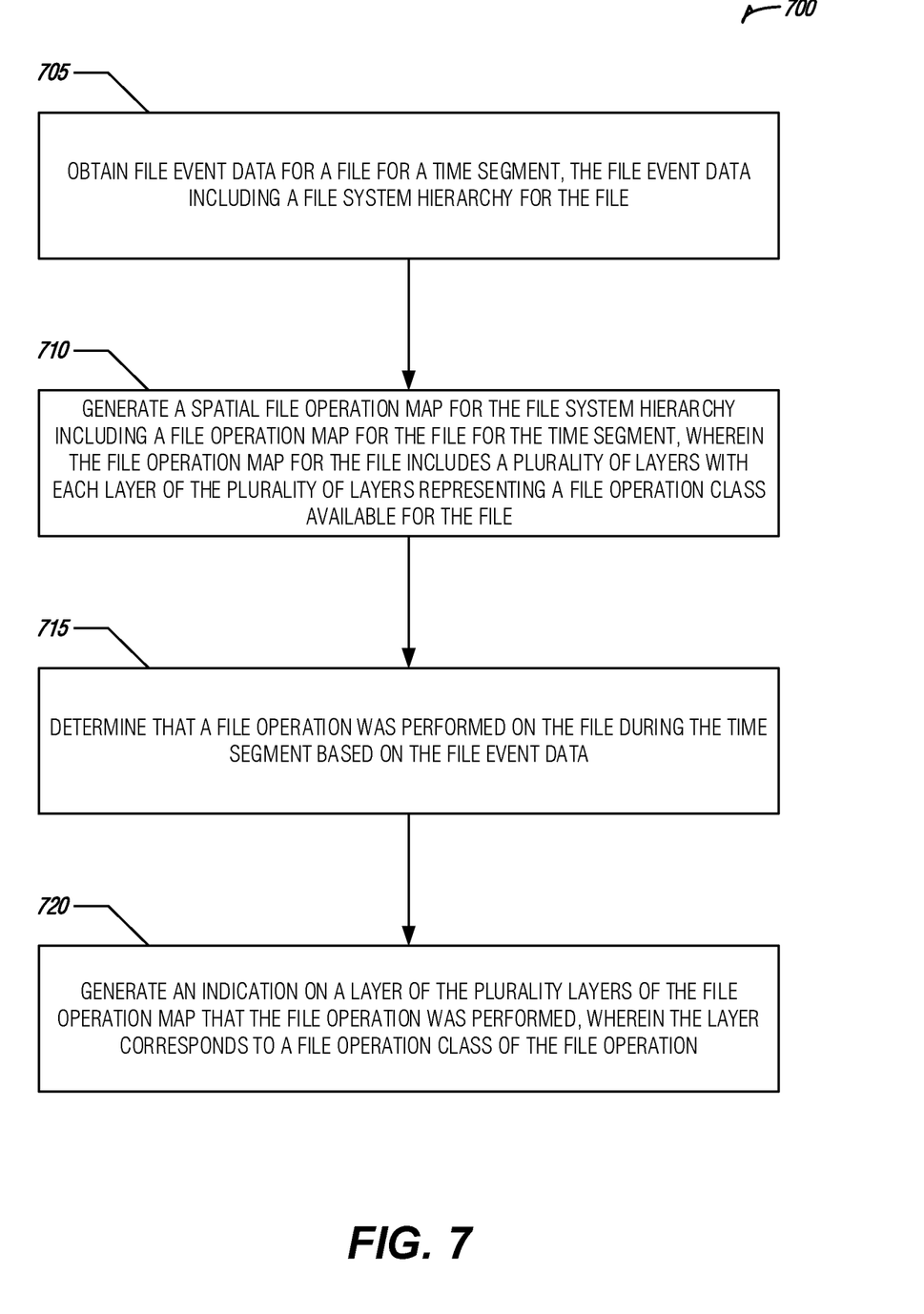
FIG. 7 illustrates a flow diagram of an example of a method for three-dimensional file event representation, according to an embodiment.

FIG. 7 illustrates a flow diagram of an example of a method 700 for three-dimensional file event representation, according to an embodiment. The method 700 may provide features as described in FIGS. 1-6.

File event data may be obtained for a file for a time segment (e.g., at operation 705). The file event data may include a file system hierarchy for the file. For example, a user computing device may have transmitted a delete file command for file test.doc in directory /usr/local/user and the file event may be obtained by the file operation manager 130 as described in FIG. 1.

A spatial file operation map may be generated for the file system hierarchy including a file operation map for the file for the time segment (e.g., at operation 710). The file operation map for the file may include a plurality of layers with each layer of the plurality of layers representing a file operation class available for the file. For example, the spatial file operation map generator 135 as described in FIG. 1 may generate a three-dimensional map for the /usr/local/usr directory that includes the file test.doc. In an example, the spatial file operation map may be divided into segments based on the file system hierarchy. In another example, the plurality of layers may include one or more of a read operation layer, a write operation layer, and a modify operation layer. In another example, the spatial file operation map may include a plurality of dimensions. Each dimension of the plurality of dimensions may correspond to a layer, each dimension may include one or more subsections, and each subsection of the one or more subsections may correspond to a top-level folder in the file system hierarchy. In an example, spatial distance between a first entity and a second entity in the spatial file operation map may be expressed as a directory distance between a first folder in the file system hierarchy corresponding to the first entity and a second folder in the file system hierarchy corresponding to the second entity.

It may be determined that a file operation was performed on the file during the time segment based on the file event data (e.g., at operation 715). An indication may be generated on a layer of the plurality layers of the file operation map that the file operation was performed (e.g., at operation 720). The layer may correspond to a file operation class of the file operation. For example, the delete file operation for the test.doc file may be indicated in a segment of a delete file operation layer of the directory /usr/local/user.

In an example, a file operation anomaly machine learning model may be generated. The spatial file operation map may be evaluated using the file operation anomaly machine learning model to change a file operation anomaly state from negative to positive and access to the file may be prevented until the file operation anomaly state has changed to negative. In an example, the file operation anomaly machine learning model may be generated using the spatial file operation map and a set of training file operations. In another example, the file operation anomaly machine learning model may be generated by a convolutional neural network.

Figure 8:
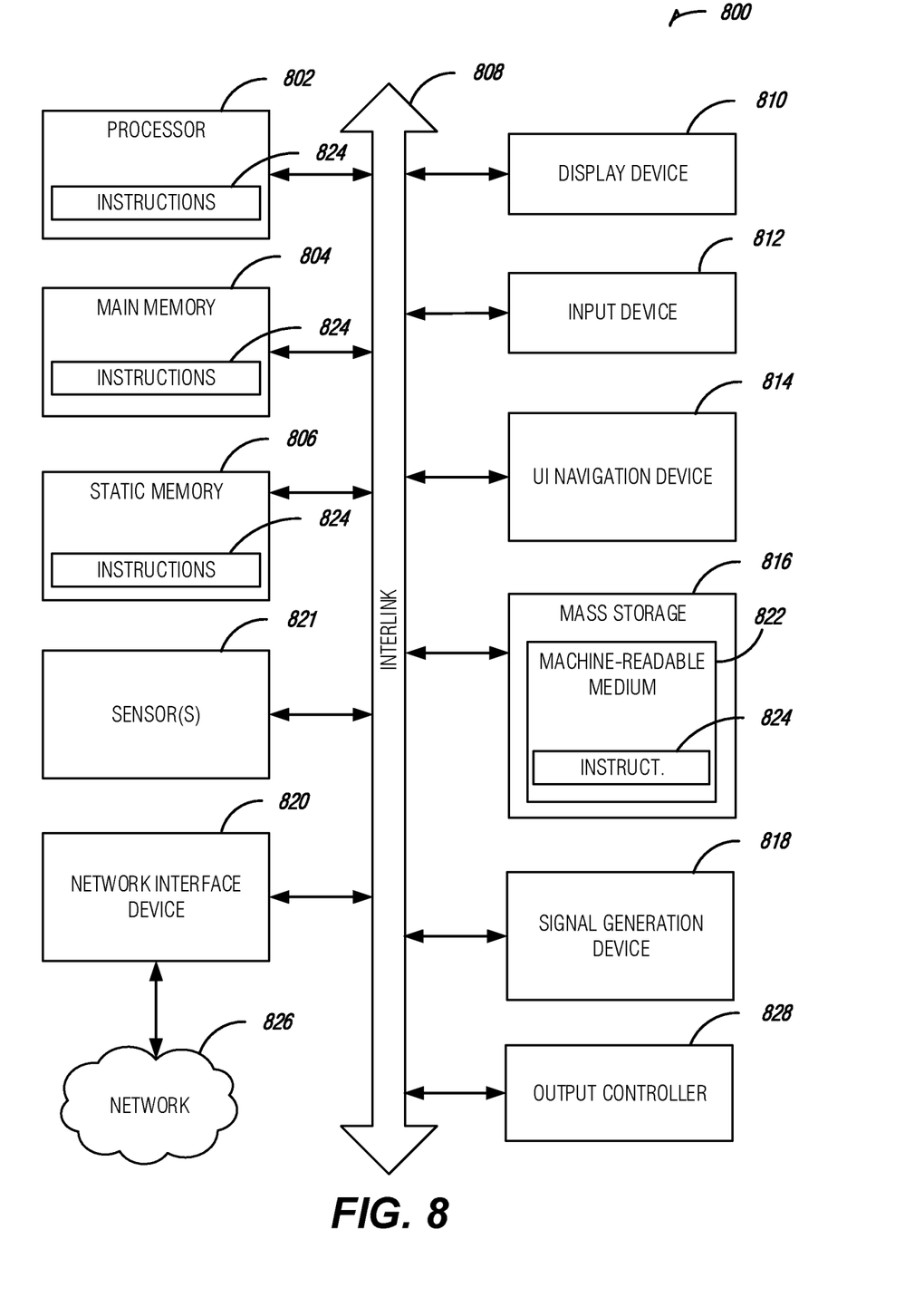
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable media). Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for spatial file operation mapping, the system comprising:
at least one processor; and
memory including instructions that, when executed by the at least one processor, cause the at least one processor to perform operations to:
obtain file event data for a file for a time segment, the file event data including a file system hierarchy for the file;
generate a spatial file operation map for the file system hierarchy including a file operation map for the file for the time segment, wherein the file operation map for the file includes a plurality of layers with each layer of the plurality of layers representing a file operation class available for the file;
determine that a file operation was performed on the file during the time segment based on the file event data;
generate an indication on a layer of the plurality layers of the file operation map that the file operation was performed, wherein the layer corresponds to a file operation class of the file operation;
generate a file operation anomaly machine learning model;
evaluate the spatial file operation map using the file operation anomaly machine learning model to change a file operation anomaly state from negative to positive; and
prevent access to the file until the file operation anomaly state has changed to negative.

2. The system of claim 1, wherein the spatial file operation map is divided into segments based on the file system hierarchy.

3. The system of claim 1, wherein the plurality of layers includes one or more of a read operation layer, a write operation layer, and a modify operation layer.

4. The system of claim 1, wherein the spatial file operation map includes a plurality of dimensions, wherein each dimension of the plurality of dimensions corresponds to a layer, wherein each dimension includes one or more subsections, and wherein each subsection of the one or more subsections corresponds to a top-level folder in the file system hierarchy.

5. The system of claim 1, wherein spatial distance between a first entity and a second entity in the spatial file operation map is expressed as a directory distance between a first folder in the file system hierarchy corresponding to the first entity and a second folder in the file system hierarchy corresponding to the second entity.

6. The system of claim 1, wherein the file operation anomaly machine learning model is generated using the spatial file operation map and a set of training file operations.

7. The system of claim 1, wherein the file operation anomaly machine learning model is generated by a convolutional neural network.

8. At least one non-transitory machine-readable medium including instructions for spatial file operation mapping that, when executed by at least one processor, cause the at least one processor to perform operations to:
obtain file event data for a file for a time segment, the file event data including a file system hierarchy for the file;
generate a spatial file operation map for the file system hierarchy including a file operation map for the file for the time segment, wherein the file operation map for the file includes a plurality of layers with each layer of the plurality of layers representing a file operation class available for the file;
determine that a file operation was performed on the file during the time segment based on the file event data;
generate an indication on a layer of the plurality layers of the file operation map that the file operation was performed, wherein the layer corresponds to a file operation class of the file operation;
generate a file operation anomaly machine learning model;
evaluate the spatial file operation map using the file operation anomaly machine learning model to change a file operation anomaly state from negative to positive; and
prevent access to the file until the file operation anomaly state has changed to negative.

9. The at least one non-transitory machine-readable medium of claim 8, wherein the spatial file operation map is divided into segments based on the file system hierarchy.

10. The at least one non-transitory machine-readable medium of claim 8, wherein the plurality of layers includes one or more of a read operation layer, a write operation layer, and a modify operation layer.

11. The at least one non-transitory machine-readable medium of claim 8, wherein the spatial file operation map includes a plurality of dimensions, wherein each dimension of the plurality of dimensions corresponds to a layer, wherein each dimension includes one or more subsections, and wherein each subsection of the one or more subsections corresponds to a top-level folder in the file system hierarchy.

12. The at least one non-transitory machine-readable medium of claim 8, wherein spatial distance between a first entity and a second entity in the spatial file operation map is expressed as a directory distance between a first folder in the file system hierarchy corresponding to the first entity and a second folder in the file system hierarchy corresponding to the second entity.

13. The at least one non-transitory machine-readable medium of claim 8, wherein the file operation anomaly machine learning model is generated using the spatial file operation map and a set of training file operations.

14. The at least one non-transitory machine-readable medium of claim 8, wherein the file operation anomaly machine learning model is generated by a convolutional neural network.

15. A method for spatial file operation mapping, the method comprising:
obtaining file event data for a file for a time segment, the file event data including a file system hierarchy for the file;
generating a spatial file operation map for the file system hierarchy including a file operation map for the file for the time segment, wherein the file operation map for the file includes a plurality of layers with each layer of the plurality of layers representing a file operation class available for the file;
determining that a file operation was performed on the file during the time segment based on the file event data;
generating an indication on a layer of the plurality layers of the file operation map that the file operation was performed, wherein the layer corresponds to a file operation class of the file operation;
generating a file operation anomaly machine learning model;
evaluating the spatial file operation map using the file operation anomaly machine learning model to change a file operation anomaly state from negative to positive; and
preventing access to the file until the file operation anomaly state has changed to negative.

16. The method of claim 15, wherein the spatial file operation map is divided into segments based on the file system hierarchy.

17. The method of claim 15, wherein the plurality of layers includes one or more of a read operation layer, a write operation layer, and a modify operation layer.

18. The method of claim 15, wherein the spatial file operation map includes a plurality of dimensions, wherein each dimension of the plurality of dimensions corresponds to a layer, wherein each dimension includes one or more subsections, and wherein each subsection of the one or more subsections corresponds to a top-level folder in the file system hierarchy.

19. The method of claim 15, wherein spatial distance between a first entity and a second entity in the spatial file operation map is expressed as a directory distance between a first folder in the file system hierarchy corresponding to the first entity and a second folder in the file system hierarchy corresponding to the second entity.

20. The method of claim 15, wherein the file operation anomaly machine learning model is generated using the spatial file operation map and a set of training file operations.

21. The method of claim 15, wherein the file operation anomaly machine learning model is generated by a convolutional neural network.

* * * * *

UNITED STATES PATENT AND TRADEMARK OFFICE
CERTIFICATE OF CORRECTION

PATENT NO. : 11,074,228 B2  
APPLICATION NO. : 16/362392  
DATED : July 27, 2021  
INVENTOR(S) : Florin et al.

Page 1 of 1

It is certified that error appears in the above-identified patent and that said Letters Patent is hereby corrected as shown below:

In the Claims

In Column 13, Line 21, in Claim 11, delete "laver," and insert --layer,-- therefor Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*